April 13, 1943.   S. S. LEAF   2,316,259
MACHINE FOR MAKING CREAM FILLED WAFERS
Filed May 6, 1939   3 Sheets-Sheet 1

Inventor
By Sol S. Leaf
Williams, Bradbury,
McCaleb & Hinkle
Attys

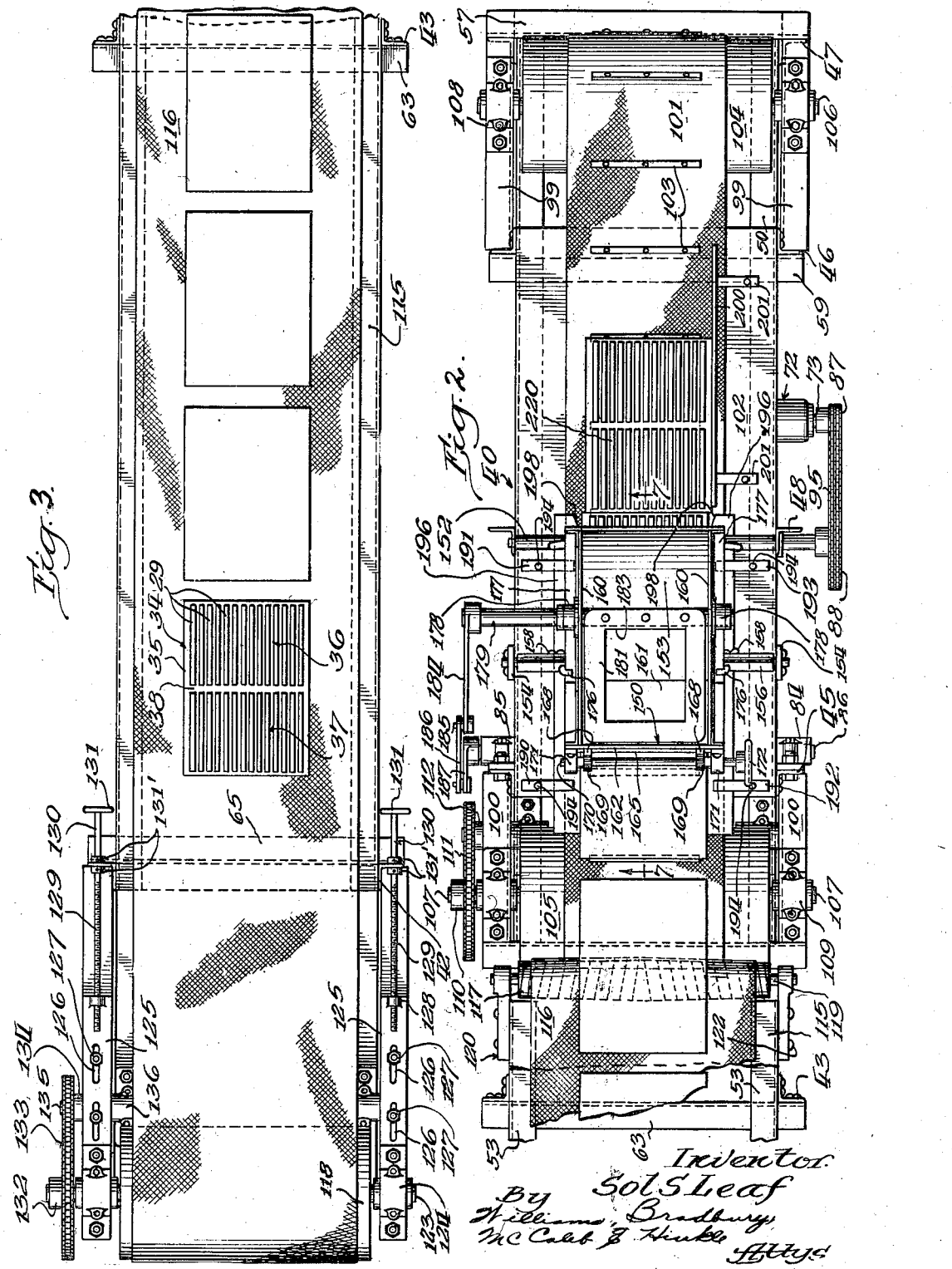

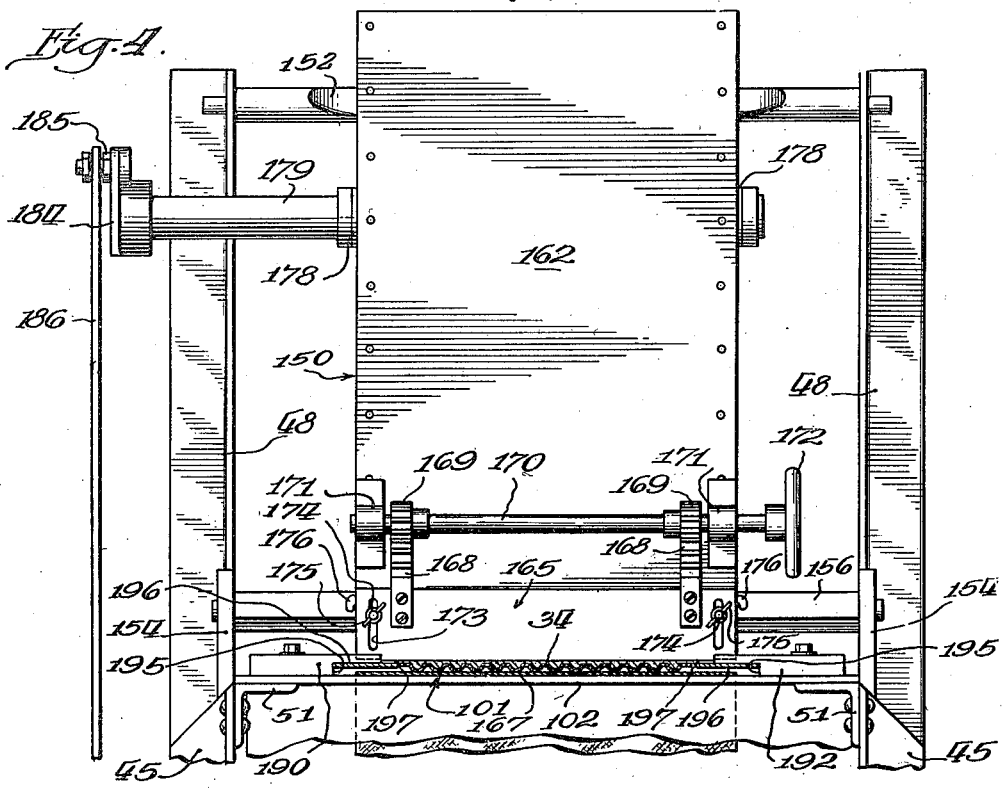

Patented Apr. 13, 1943

2,316,259

UNITED STATES PATENT OFFICE 2,316,259

MACHINE FOR MAKING CREAM FILLED WAFERS

Sol S. Leaf, Chicago, Ill., assignor to Overland Candy Corporation, Chicago, Ill., a corporation of Illinois Application May 6, 1939, Serial No. 272,122

1 Claim. (Cl. 91—3)

The present invention relates to machines for making cream filled wafers and is particularly concerned with a machine of the type adapted to fill wafers having a plurality of longitudinally extending grooves formed in the wafer.

Another object of the invention is the provision of an improved machine adapted to be used in the manufacture of confections of the type described, by means of which a cream filling may be spread uniformly upon the pastry parts of the wafer and the products so made conveniently handled and disposed in the machine that they may be combined to make the completed wafer with a minimum amount of manual labor.

Another object of the invention is the provision of an improved machine of the class described which may be utilized for making cream filled wafers of various kinds, and by means of which the amount of filling may be accurately predetermined.

Another object of the invention is the provision of an automatic spreading machine for making cream filled wafers and other products, which is adapted to provide pastry members with a filling of predetermined character and depth, or with a plurality of different layers of filling of different characteristics, and which is adapted to operate continuously when provided with suitable supplies of pastry members and filling.

Other objects and advantages of the invention will be apparent from the following description and the accompanying drawings, in which similar characters of reference indicate similar parts throughout the several views.

Referring to the drawings:

Fig. 2 is a top plan view of that portion of the machine illustrated in Fig. 1;

Fig. 3 is a top plan view of the output end of the machine;

Fig. 4 is a fragmentary vertical sectional view, taken on the plane of the line 4—4 of Fig. 1, looking in the direction of the arrows.

Figure 1:
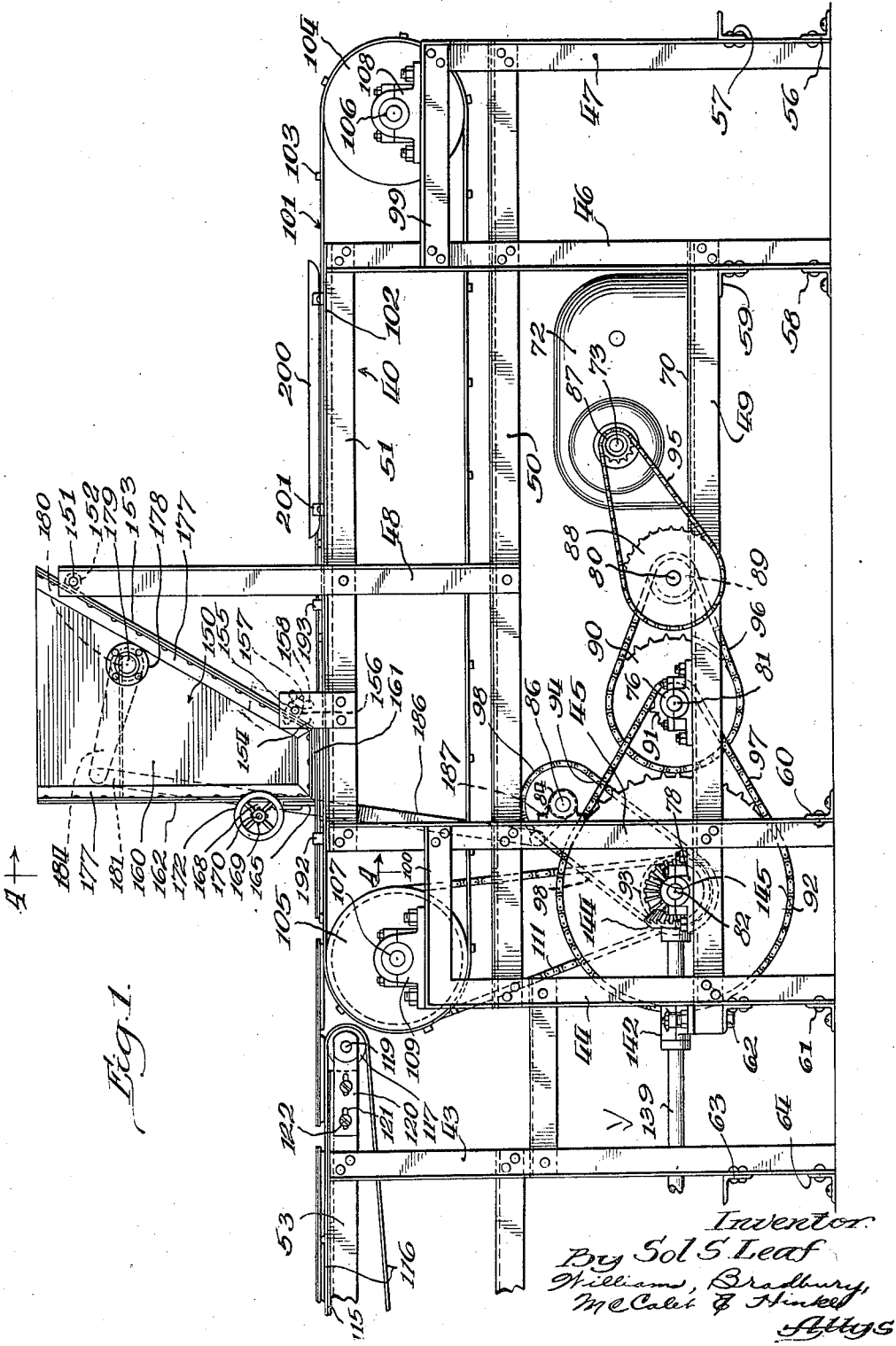
Fig. 1 is a vertical elevational view of the input end of a spreading machine constructed according to the invention.

The present machine may be utilized for making ordinary cream filled wafers of the type having upper and lower pastry members separated by a cream filling.

Referring now to Figs. 1 and 2, the machine for manufacturing such products is shown in elevation in these figures. The machine, which is indicated in its entirety by the numeral 40, comprises a framework having a plurality of vertically extending frame members 41—48, which are suitably secured to the longitudinally extending horizontal frame members 49—55, which preferably extend at substantially right angles to the vertical frame members, and are secured thereto by rivets or other suitable fastening means.

The framework of the machine may comprise two substantially identical vertical frames, one for each side of the machine, the vertical side frames being joined together by a plurality of horizontally and transversely extending frame members 56—68, preferably all of the same length and fixedly secured to two side frames of the machine by means of rivets or other suitable fastening means.

The horizontal frame members 55, 55 are preferably arranged adjacent the bottom of the side frames so as to leave the space between the side frames open and free at the upper portion throughout the length of the machine. The lowermost frame members 56, 58, 60, 61, 64, 66, and 68 are arranged with one flange extending horizontally at the bottom to serve as a foot flange, which may also be utilized for securing the machine to the floor.

Any suitable standard shape of frame members may be utilized, although in the present embodiment the machine has been constructed mainly of angle irons having two flanges at right angles to each other.

The frame members 49 at the opposite sides of the framework may be utilized for supporting a drive mechanism by means of a horizontal plate 70 carried by said frame members and fixedly secured thereto. The plate 70 may support an electric motor 71, the drive shaft of which is adapted to drive a speed reducing mechanism 72, having a drive shaft 73.

The frame members 49 may also support a plurality of bearings 74—79 for rotatably supporting the shafts 80—82. Each of the shafts 80—82 is provided with suitable thrust collars 83 and additional bearings 84, 85 may be carried by the vertical frame members 45 for rotatably supporting the shaft 86. The shafts 73, 80, 81, 86 and 82 are provided with suitable sprocket wheels 87—94, predetermined of these sprocket wheels being connected by chains 95—98, as shown in Fig. 1, whereby the shafts 82 and 86 are driven at suitably reduced speeds for operation of the movable parts of the machine.

At the upper part of the machine frame it is provided at each side with the horizontal frame members 99, 100 at each end of the framework of Fig. 1, these frame members being depressed below the uppermost frame members 51 sufficiently so that a conveyor belt 101 has its upper portion slidably supported upon a table plate 102, which is carried by the uppermost horizontal frame members 51.

The conveyor belt 101 may be made of canvas, rubber, or suitable flexible compositions, and it has an endless belt provided with a plurality of transverse outwardly projecting lugs 103 at regularly spaced intervals.

The belt 101 is rotatably mounted upon drums 104, 105, which are carried by shafts 106, 107, rotatably mounted in bearings 108, 109 at each end of each shaft, and carried by frame members 99 and 100. The drive of the conveyor belt 101 is from the right toward the left in Fig. 1, by means of the driving drum 105, the shaft 107 of which carries a sprocket wheel 110, which is driven by means of chain 111 and sprocket wheel 112 on the shaft 82.

The table plate 102 extends from the vertical frame member 46 to the vertical frame member 45, and provides a smooth and flat support over which the belt 101 slides and against which the belt and wafers rest while the spreading action takes place.

Referring to Figs. 1 and 3, the uppermost angle irons 53 of the framework at this end of the machine may also support a table plate 115, which is adapted to support another conveyor belt 116, which is rotatably mounted upon the drums 117 and 118. Drum 117 has a shaft 119 rotatably mounted in bearings carried by the adjustable frame members 120, which are provided with slots 121 for adjustable securement to the frame members 53 by means of screw bolts 122.

The adjustable members 120 permit adjustment of the proximity of the drum 117 and also that end of the conveyor belt 116 to the conveyor belt 101 carried by the driving drum 105. The drum 117 is preferably made relatively smaller and may be termed a roller, in order that the upper horizontal portion of the conveyor belt 116 may be brought quite close to the horizontal portion of the conveyor belt 101.

The drum 118 has its shaft 123 rotatably supported in bearings 124 at each side of the framework, which are carried by the slidably mounted frame members 125 on each side of the frame. Each of the slidably mounted frame members 125 consists of a metallic member having the slots 126 for receiving the screw bolts 127, which are fixedly mounted in the upper frame members 55.

The frame members 125 have upwardly extending lugs 128 provided with a threaded bore for receiving the threaded end 129 of a screw shaft 130, which has a hand wheel 131 and is rotatably mounted in the vertical frame member 42 by means of a suitable bearing and thrust collars 131' on each side.

The bearings 124 are thus mounted for horizontal movement and adjustment by means of the hand wheels 131 so that the belt 116 may be suitably tightened. Each of the drums 118, 117, 105, and 104 may be provided with a suitable crown so that the belt will be kept in the middle of each roller or drum, in spite of inaccuracies of alignment of the axes of the drums.

The drum 118 has its shaft 123 driven by means of a sprocket wheel 132 engaging a chain 133, which also engages the sprocket wheel 134 on shaft 135. The shaft 135 is rotatable in bearings 136 carried by the frame members.

The drive shaft 139 is rotatably supported in the bearing 142 (Fig. 1) carried by transverse frame members 62. The drive shaft 139 has at its right hand (Fig. 1) a bevel gear 144, which is driven from the bevel gear 145 on the shaft 82.

The relation of the driving gears and sprockets is such that the belt 116 is driven at a greater speed than the belt 101, for a purpose later to be described.

Referring again to Fig. 1, the vertically extending frame members 48 are secured at each side of the machine to the frame members 50 and 51, and project above the belt 101 for the purpose of supporting a hopper 150. For this purpose each of the frame members 48 is provided with a cylindrical aperture 151, forming a bearing for receiving a supporting shaft 152 carried by the upper part of the diagonally extending wall 153 of the hopper.

The horizontal frame members 51 also support a pair of upwardly extending plates 154 which are provided with apertures 155 for receiving the cylindrical ends of a rectangular bar 156. The rectangular bar 156 is adapted to receive the threaded screw bolts 157, having thumb nuts 158, having laterally turned ends 176 engaging the projecting edges of the hopper wall 153, by means of which the position of the lower part of the hopper may be adjustably secured.

The hopper 150 may comprise a sheet metal member of suitable non-corrodible metal, such as stainless steel, having a pair of trapezoidal side walls 160, a flat bottom wall 161, a rectangular rear wall 153, and a rectangular front wall 162.

The front, rear, and bottom walls may be provided with attaching flanges overlapping the side walls 160 or angle irons may be used to secure the walls together at the corners so as to provide the downwardly tapering hopper, which has a substantially rectangular discharge aperture 163 at the forward end of the bottom, due to the fact that the bottom plate 161 is of less area than the bottom of the hopper.

The angle irons 177, which are used to secure the walls of the hopper together, are preferably disposed on the outside of the hopper at the corners thereof, so that the inner surface of the hopper may be as smooth as possible.

The bottom 161 is supported adjacent the hopper, but slightly spaced from the top of a wafer to be spread, which is carried by the belt to be spread with filler, which wafer is carried by the belt 101.

The forward wall 162 of the hopper has its lowermost edge 164 spaced from the wafers 34 an amount equal to the thickness of the thickest spread to be applied, and the hopper is preferably provided with a transversely extending striking plate 165, having a beveled edge 166 and a knife-like lower edge 167.

The striking plate 165 is movably mounted by means of a pair of racks 168, the teeth of which engage pinions 169 carried by the shaft 170.

The shaft 170 is rotatably mounted in bearings 171 carried by the wall 162 at the opposite ends of the shaft 170. The shaft 170 is provided with a hand wheel 172, fixedly secured to the shaft and adapted to actuate the pinions 169. The striking plate 165 is also slidably supported by means of the slots 173, which receive the screw bolts 174 carried by the wall 162 and provided with wing nuts 175.

Thus the striking plate 165 may be moved to any desired position by means of the hand wheel 172, and secured in adjusted position by means of the wing nuts 175. The striking plate 165 determines the thickness of the filler which is spread upon the wafer 34.

The side walls 160 of the hopper are preferably provided with bearings 178 at each side adjacent the top for rotatably supporting the rocker shaft 179. The rocker shaft 179 has a flattened portion 180, to which a paddle 181 is secured for the purpose of agitating and feeding the filler 182. The paddle 181 is preferably a substantially rectangular plate provided with an inner rectangular aperture 183.

At its outer end the shaft 179 carries a crank arm 184, which is connected by a screw bolt 185 to a connecting rod 186. The connecting rod 186 has its lower end pivotally connected to a crank arm 187 carried by a shaft 86, which is driven by means of a sprocket wheel 94 and chain 98.

Thus the paddle 183 is periodically moved upwardly and downwardly in the hopper, tending to cause a downward pressure of the filler 182 in the hopper and to keep the material sufficiently agitated in the hopper to feed it uniformly from the discharge aperture.

The table plate 102 is provided at each side adjacent the hopper 150 with a pair of guide-supporting members 190—193. Each guide supporting member comprises a substantially rectangular bar of metal, having a bore for receiving the through bolt 194, which is adapted to clamp it to the table plate 102 and frame member 51.

Each guide-supporting member 190—193 is rabbeted at 195, and two guide-supporting members at each side of the machine carry a longitudinally extending plate 196. The elevation of the plate 196 is such that it engages the edge of the wafer 34, and the spacing between the plates 196 is such that the wafer 34 may slide between them.

The guide plates 196 have their inner guide edges 197 parallel except at the leading end of these guide members, where they are provided with the beveled surfaces 198 (Fig. 2) for guiding the wafers into proper position in the event they are slightly displaced on the belt.

The operation of the spreading machine is as follows: The wafers 34 (Fig. 3) are of such size that the cylindrical formations may be received between the transverse lugs 103 on the belt 101. The spacing between the lugs 103 is such that the wafers 34 have their cylindrical portions fitting between the lugs 103. The flat border 35 about the cylindrical portions of the wafers is of sufficient width at each end of the wafer to cover half of the lugs 103. Thus the wafers present a continuous surface of pastry to the lower side of the hopper, which can be spread with the filler without any waste.

The lug or strip following the wafer is adapted to engage the ends of the cylindrical formations on the wafer, to carry the wafer along on the belt.

The machine may be provided with guide members 200 carried by supporting brackets 201 on the table plate 102 at the right of the hopper in Fig. 1, so as to guide the operator into the placing of wafers in the proper position, midway between the sides of the belt.

The belt 101 has its upper surface rotating from the right toward the left in Fig. 1, and it carries the wafers 34 under the hopper 150, where they are firmly supported by the plate 102 under the belt. As the wafer passes under the discharge slot 163 of the hopper 150, plastic filler flows out into the grooves of the wafer, and covers the entire surface of the wafer as the wafer progresses toward the left under the hopper.

The striking plate 165 determines the depth of the layer of filler on the wafer, and smooths off the surface of the filler, the beveled surface 166 serving to provide an increased pressure at the knife edge 167 of the striking plate 165, which gives a smoother surface to the filler.

The belt 101 continues to carry the filled wafers out from under the hopper and over on the belt 116. The belt 116 is moving at a faster rate, which serves to increase the separation between the filled wafers on the belt 116 and to indicate to the operator the boundaries between the respective wafers. The filled wafers as they emerge from the hopper present a smooth continuous and unbroken upper surface of filler, but the increased speed of the belt 116 causes each wafer, which is drawn on the belt 116, to be spaced a distance from each succeeding wafer.

The product of the machine and method is stronger than the cream filled wafers of the prior art, and may be shipped and handled with less breakage. There is a tight adhesion between the filler and wafers, and the internal ribs 220 in the grooves 31 of the wafer anchor the filler against longitudinal movement in the groove.

While I have illustrated a preferred embodiment of my invention, many modifications may be made without departing from the spirit of the invention, and I do not wish to be limited to the precise details of construction set forth, but desire to avail myself of all changes within the scope of the appended claim.

Having thus described my invention, what I claim as new and desire to secure by Letters Patent of the United States, is:

In a machine for spreading a confection on a succession of pastry wafers; each of said wafers being of rectangular form, having side and end flanges in the same plane, and having a series of parallel trough-like formations depressed beneath the plane of said flanges and presenting abutment portions adjacent the end flanges substantially parallel to the edges of the latter; said machine comprising a frame, an endless conveyor belt operatively supported on said frame to present a horizontal top run, said wafers being disposable on said top run with their end flanges extending transversely of said run in contiguous relation and with said trough-like formations supporting the wafers on said run, transversely extending driving members secured on said belt and extending beneath the contiguous end flanges of adjacent wafers in driving engagement with the adjacent abutment portion of a preceding wafer, said wafers being transversely slidable on said run, a hopper carried by said frame and having a lower end opening to feed confection continuously onto the wafers on said run, and means for guiding said wafers accurately under said opening comprising plates supported directly beneath said hopper at the sides of said opening and freely overlying the opposite margins of said run, said plates having parallel edges spaced apart so as to slidingly guide the wafers while the confection is being supplied thereon and having divergent entering portions to guide the wafers between said edges.

SOL S. LEAF.